(12) United States Patent
Hu et al.

(10) Patent No.: US 8,188,957 B2
(45) Date of Patent: May 29, 2012

(54) LED BACKLIGHTING FOR LIQUID CRYSTAL DISPLAY (LCD)

(75) Inventors: Darwin Hu, San Jose, CA (US); Kebin Li, Fremont, CA (US)

(73) Assignee: Money Park Investments Ltd., Hong Kong (HK)

( * ) Notice: Subject to any disclaimer, the term of this patent is extended or adjusted under 35 U.S.C. 154(b) by 0 days.

(21) Appl. No.: 13/183,429

(22) Filed: Jul. 15, 2011

(65) Prior Publication Data

US 2012/0026212 A1    Feb. 2, 2012

Related U.S. Application Data

(63) Continuation of application No. 11/065,699, filed on Feb. 23, 2005, now Pat. No. 7,990,352.

(51) Int. Cl.
*G09G 3/36*     (2006.01)

(52) U.S. Cl. ............................ 345/88; 345/102; 345/690

(58) Field of Classification Search .................. 345/88, 345/89, 98, 99, 100, 102, 204, 690, 694; 349/108, 109; 382/167
See application file for complete search history.

(56) References Cited

U.S. PATENT DOCUMENTS

| | | | |
|---|---|---|---|
| 5,803,579 | A | 9/1998 | Turnbull et al. |
| 6,621,482 | B2 | 9/2003 | Fuller |
| 6,888,529 | B2 | 5/2005 | Bruning et al. |
| 7,456,805 | B2 | 11/2008 | Ouderkirk et al. |
| 2003/0107559 | A1* | 6/2003 | Furman .................. 345/204 |

* cited by examiner

*Primary Examiner* — Abbas Abdulselam
(74) *Attorney, Agent, or Firm* — Wuxi Sino IP Agency, Ltd.; Joe Zheng (57) ABSTRACT

Techniques for providing LED-based backlighting in liquid crystal flat panel displays are disclosed. In one embodiment, the backlighting includes at least three color groups of light emitting diodes (LEDs) that are turned on successively for one frame of image. Liquid crystals (pixels) in an LCD are controlled in accordance with a display signal to transmit none, all or a determined amount of one or more of the colored lights from the three color groups of light emitting diodes in a cycle, resulting in an LCD with vivid colors and minimized tailing effects.

18 Claims, 7 Drawing Sheets

FIG. 3B

LED BACKLIGHTING FOR LIQUID CRYSTAL DISPLAY (LCD)

CROSS REFERENCE TO RELATED APPLICATION

This is a continuation of U.S. application Ser. No. 11/065,699 filed on Feb. 23, 2005, now U.S. Pat. No. 7,990,352 issued on Aug. 2, 2011.

BACKGROUND OF THE INVENTION

1. Field of the Invention

The present invention is related to the area of display devices. More particularly, the present invention is related to techniques of using a liquid crystal display without subpixels or color filters to display colors from colored backlighting.

2. Description of the Related Art

Liquid crystal display (LCD) is one of the popular display devices for conveying digital information, such as images, data and movies. The decreased weight and size of a flat panel display greatly increases its versatility over a cathode ray tube (CRT) display. High quality flat panel displays are typically back-lit. That is, a source of illumination is placed behind the LCD layers to facilitate visualization of the resultant image. Flat panel LCD devices or units are used today in many applications including the computer industry where flat panel LCD units are an excellent display choice for lap-top computers and other portable electronic devices. Because the technology of flat panel LCD units is improving, they are being used more and more in other mainstream applications, such as desktop computers, high-end graphics computers, and as television and other multi-media monitors.

Most computer LCD panels are back-lit with built-in fluorescent tubes behind the LCD. A white diffusion panel behind the LCD redirects and scatters the light evenly to ensure a uniform display. This is known as a backlight or backlighting. One of the commonly used fluorescent tubes in LCD panels is a tiny Cold Cathode Fluorescent Lamp (CCFL) for the backlight. It provides a bright white light source that can be diffused by the panel behind the LCD. In addition to providing ample lighting, CCFLs do not rise far above the ambient temperature. This makes them ideal for LCD panels since the light source is in close proximity to other components that could be ruined by excessive heat.

One amazing thing about these CCFLs is their incredible size. They are very thin and the board that drives a lamp is very small as well. However, it is not that hard to break them, which is why the LCD display may go dark if a laptop computer drops onto a hard floor but still works.

While everyone appears to be focused on the "zero radiation" advantage of the LCD technology, no one actually think what is behind the liquid crystals (which the "L" and "C" letters stand for). This happened to be the same fluorescent light technology which was not recommended for use as the only light source in offices.

A fluorescent light is most often a long straight glass tube that produces white light. Inside the glass tube there is a low-pressure mercury vapor. When ionized, mercury vapor emits ultraviolet light. Human eyes are not sensitive to ultraviolet light. The inside of a fluorescent light is coated with phosphor. Phosphor is a substance that can accept energy in one form and emit the energy in the form of visible light. For example, energy from a high-speed electron in a commonly seen TV tube, also referred to as cathode ray tube or CRT, is absorbed by the phosphors that make up the pixels. The light from a fluorescent tube is the light given off by the phosphor coating the inside of the tube. The phosphor fluoresces when energized, hence the name. It has been concluded that directly staring at a source of fluorescent light can be just as bad, if not worse. But there is no mentioning anywhere that that most LCD panels are actually a reflection of fluorescent lights and in many cases people spend a considerable amount of time in a day staring at such a source.

Another one of the reasons that a fluorescent light is used as a backlighting source is the inherent characteristics of being close to the sunlight. However, the spectrum of a typical fluorescent light is no close to that of the sunlight, often requiring compensation on white balance. No or improper adjustments on white balance would result in distortions of colors.

U.S. Pat. No. 6,657,607 proposes a solution of using multiple light sources for color balancing within a liquid crystal flat panel display unit. In particular, altering the brightness of two or more light sources, having differing color temperatures, is thus providing color balancing of a liquid crystal display unit within a given color temperature range. The patent, however, corrects only one aspect of the problems in a liquid crystal display that is backlit by fluorescent lighting by introducing additional lighting sources and polarization means.

Light emitting diodes provide an alternative light source to the fluorescent light source. Besides having a much longer operating life, the light emitting diodes provide steady and pure colors. The current applications of the light emitting diodes in LCD are largely to combine the colored lights from the light emitting diodes for a simulated white light. The inventors herein have conceived that the light emitting diodes as the backlighting, if designed properly, can be used to enhance many properties of LCD.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention The invention pertains to liquid crystal display (LCD) that inherently has no suppixels and no color filters but is capable of displaying colors, hence referring to as monochromic LCD. In a traditional LCD panel for colors, each pixel includes three subpixels that act three respective light passage of three colored lights, such as red, green and blue. By controlling the three subpixels as well as the amount of light passing through each of the three pixels, millions of colors could be perceived. However, one of the problems in the traditional LCD panel is the loss of display resolution. According to one aspect of the present invention, each pixel in an LCD does not have any subpixels and color filters, and works independently, hence the display resolution is greatly enhanced without actually increasing additional pixels.

According to another aspect of the present invention, unlike the subpixels in the traditional LCD in that each of the subpixels is predetermined to pass a specified colored light, such as three subpixels in a pixel are configured to transmit respectively red, green and blue lights, each of the pixels in the LCD contemplated in the present invention is not configured to pass a predefined colored light. In one embodiment, three colored lights are turned on successively, depending on an image to be displayed, all pixel are respectively controlled to allow no, all or some of one or more of the three colored lights to pass, resulting in millions of perceived colors.

According to still another aspect of the present invention, the light emitting diodes are in more than three predetermined colors but still grouped as three color lights groups or simply group herein. One of the purposes of having more than one colored lights in a color group is to ensure that the visible spectrum is as much covered as possible.

The present invention may be implemented as a method, an apparatus or a port of a system. According to one embodiment, a liquid crystal display device comprising a liquid crystal display panel including a plurality of pixels, each of the pixels including no further subpixels and reproducing a perceived color from one or more colored lights that are transmitted successively through a corresponding liquid crystal turned on in accordance with a display signal that is supposed to be displayed on the liquid crystal display panel, wherein the display signal may include, but may not be limited to, a text signal, an image signal or a video signal.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to liquid crystal display (LCD) that inherently has no suppixels and no color filters but is capable of displaying colors. According to one aspect of the present invention, each pixel in an LCD does not have any subpixels, as if each of the subpixels is a pixel, hence the display resolution of the LCD is greatly enhanced without actually increasing additional pixels. According to another aspect of the present invention, unlike the subpixels in the traditional LCD in that each of the subpixels is predetermined to pass a specified colored light, such as three subpixels in a pixel are configured to transmit respectively red, green and blue lights, each of the pixels in the LCD contemplated in the present invention is not configured to pass a predefined colored light.

In one embodiment, three colored lights are turned on successively, depending on an image to be displayed, all pixel are respectively controlled to allow no, all or some of one or more of the three colored lights to pass, resulting in millions of perceived colors.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

It deems necessary to review some basics of a liquid crystal display (LCD). As the name suggests, one of the main materials in an LCD is liquid crystals while one of the features of the liquid crystals is that they are affected by an electrical field applied thereon. A particular sort of nematic liquid crystal used in an LCD, called twisted nematics, is naturally twisted. Applying an electrical field to these liquid crystals will untwist them to varying degrees, depending on the amount of the current. An LCD operates based on these liquid crystals because they react predictably to an electrical field in such a way as to control light passage.

There are two main types of LCD used in display devices, passive matrix and active matrix. Passive-matrix LCD uses a simple grid to supply a charge to a particular pixel on the display. The process starts with two glass layers called substrates. One substrate is given columns and the other is given rows made from a transparent conductive material. This is usually indium-tin oxide. The rows or columns are connected to a circuit that controls when a charge is sent down a particular column or row. The liquid crystal material is sandwiched between the two glass substrates, and a polarizing film is added to the outer side of each substrate. To turn on a pixel, the circuit sends a charge down the correct column of one substrate and a ground activated on the correct row of the other. The row and column intersect at the designated pixel, and that delivers the voltage to untwist the liquid crystals at that pixel.

Active-matrix LCD depends on thin film transistors (TFT). Basically, TFTs are tiny switching transistors and capacitors. They are arranged in a matrix on a glass substrate. To address a particular pixel, the proper row is switched on, and then a charge is sent down the correct column. Since all of the other rows that the column intersects are turned off, only the capacitor at the designated pixel receives a charge. The capacitor is able to hold the charge until a next refresh cycle. And if the amount of voltage supplied to a crystal is carefully controlled, the crystal can be untwisted just enough to allow some light through. By doing this in very exact, very small increments, an LCD can create a gray scale provided there is a white backlighting. Most displays today offer 256 levels of brightness per pixel. An LCD that can show colors must have three subpixels with red, green and blue color filters to create each color pixel.

Figure 1A:
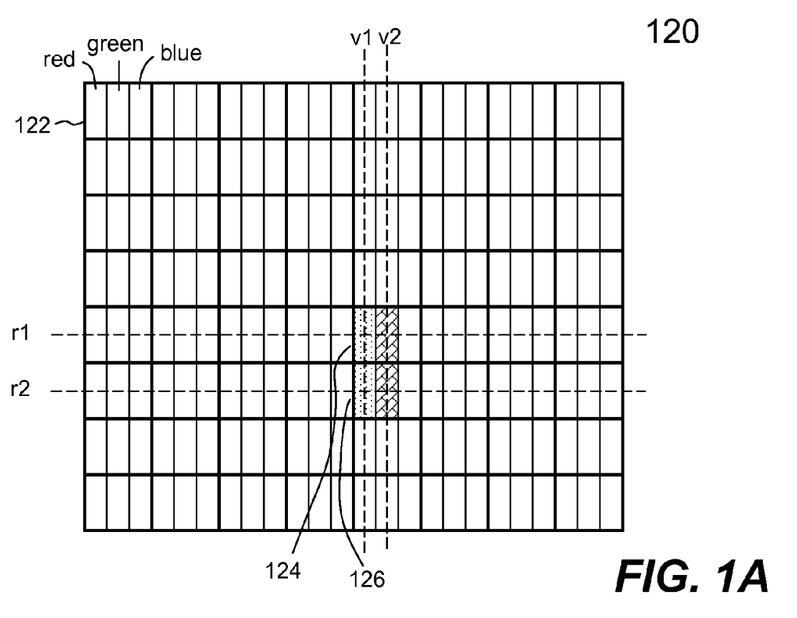
FIG. 1A shows an array of pixels in a traditional LCD, each of the pixels has three subpixels respectively for transmit a red, a green and a blue light.

FIG. 1A shows an array of pixels 120 in an LCD. Each of the pixels, such as a pixel 122, has three subpixels labeled respectively red, green and blue. Through the careful control and variation of the voltage applied while each subpixel can reach 256 levels of brightness (shades) per pixel. Combining the subpixels produces a possible palette of 16.8 million colors (e.g., 256 shades of red×256 shades of green×256 shades of blue). For example, when two subpixels in pixels 124 and 126 are applied with control signals via column and row lines, the backlighting passes through the red and green subpixels, causing a mixed impression of "yellow". In extreme cases, when all subpixels in a pixel are turned on or off, a white or black color is created or perceived. In applications of showing an image or video on an LCD, control signals in accordance with an image or video are applied to the pixels, respectively, causing the subpixels in each of the pixels respectively on or off. As a result, the image or video is displayed on the LCD.

Figure 1B:
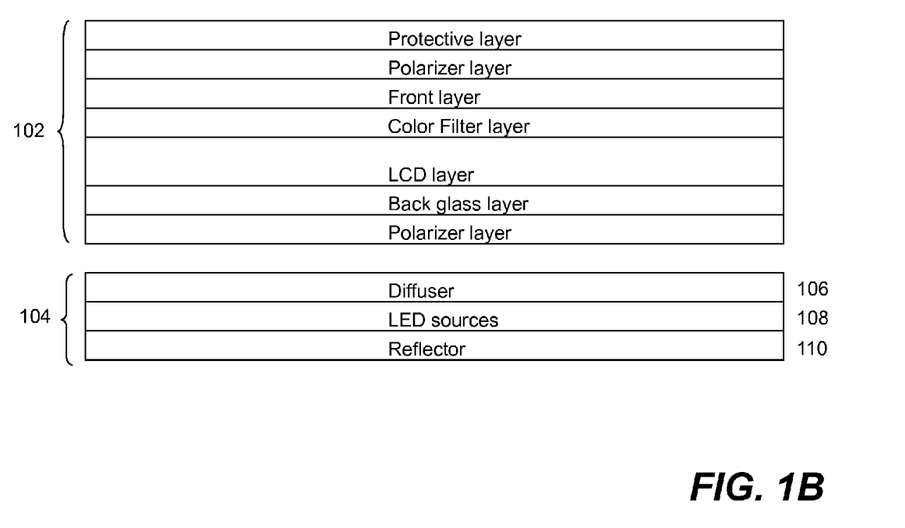
FIG. 1B shows a cross sectional view of an LCD device that employs the LCD of FIG. 1A.

Referring now to FIG. 1B, there shows a cross sectional view of an LCD device 100 that employs an LCD 102 that may be the LCD 120 of FIG. 1A. The LCD device 100 includes the LCD 102 and a backlighting section 104. Depending on manufacturing process or specification configuration, the LCD 102 comprises at least some of a protective layer, a polarization layer, a front layer, a color filter layer, an LCD layer, a back glass layer and a polarizer layer. The backlighting section 104 typically includes a light source producing white lighting. Commonly, the light source may be one or more of cold cathode fluorescent lamps or an array of light emitting diodes. Through the selective color filtering by the subpixels in the LCD 102, an color image or video can be displayed.

One of the problems, however, in the LCD 120 or the LCD device 100 is the loss of display resolutions. As shown in FIG. 1A, every three subpixels are used only as a single pixel. For example, a typical laptop computer supports display resolutions up to 1,024×768. The multiplication of 1,024 columns by 768 rows by 3 subpixels is 2,359,296, which means that there are an enormous number of transistors that have to be etched on a substrate in the LCD 120. If the resolutions are higher (e.g., in LCD TV), the number of transistors that have to be etched on a substrate would be increased dynamically, so does the cost of the LCD.

Another one of the problems in the LCD 120 is the tailing effects often seen in a video with fast moving objects. Because the "on" and "off" status (refreshing) of the subpixels are controlled periodically, when the objects in a scene move too fast (e.g., faster than the refreshing speed), tailing effects would be shown, causing blurred display of the objects. To reduce such artifacts, there have been many efforts including increasing the refreshing speed. But in the end, the costs of producing an LCD are often increased accordingly.

Figure 2A:
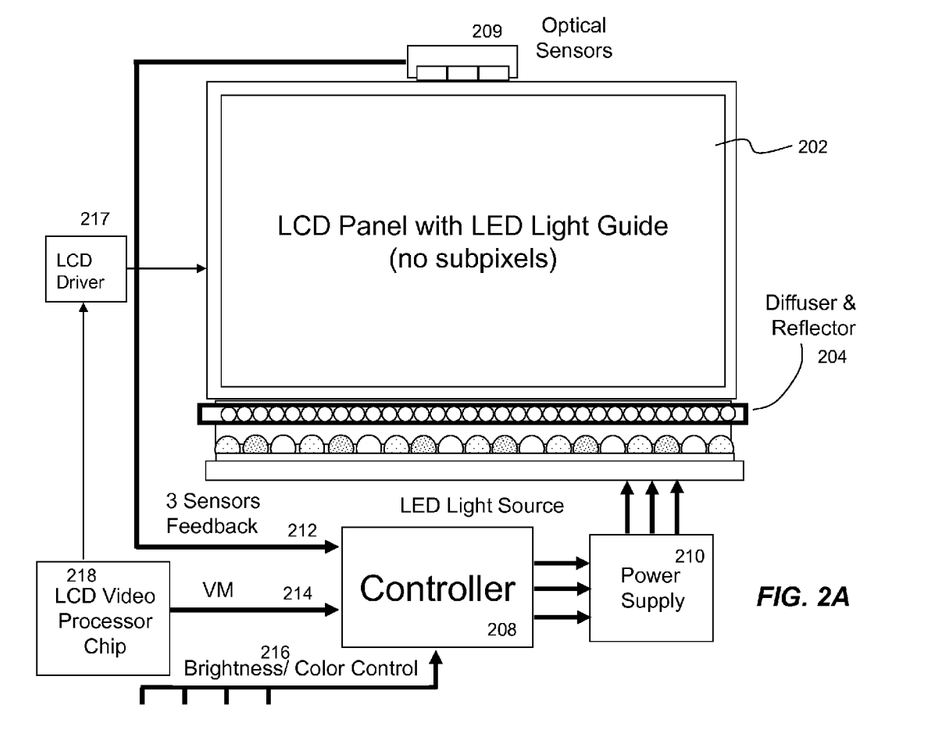
FIG. 2A shows an exemplary LCD device contemplated in the present invention.

FIG. 2A shows an LCD device 200 contemplated in the present invention. The LCD device 200 includes an LCD 202 that is further shown in FIG. 2B. Different from the LCD 120 of FIG. 1A, the LCD 202 does not have the concept of subpixels. The LCD 202 is essentially monochromic. When a pixel includes three subpixels, the resultant display resolutions of an LCD are significantly reduced because three subpixels work as a single pixel. For example, for a display image resolution of 1,024 columns by 768 rows, the LCD 120 of FIG. 1A has to have 2,359,296 subpixels in total. As described below, the LCD 202 needs only 1,024×768=786,432 pixels. If each subpixel was used as an independent pixel, with 2,359,296 subpixels, the LCD 202 would be able to provide a much higher display resolution.

Figure 2B:
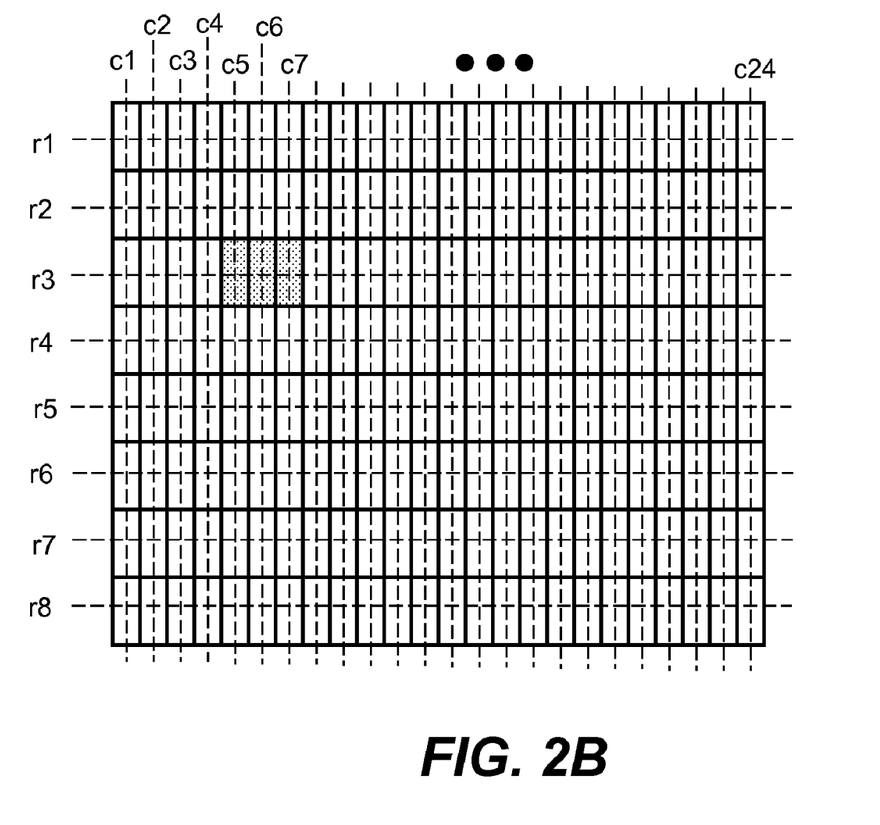
FIG. 2B shows an exemplary embodiment of an LCD that may be used in FIG. 2A.

Since no subpixels are used, each pixel in the LCD 202 is configured independently to provide a light path in a controlled manner, namely, only a specified amount of light can be passed through a pixel. In one embodiment, with proper electrical field (via voltage/current) applied thereto, 256 levels of light amount can be passed through a pixel in a controlled manner. Such 256 levels are equivalent to 256 levels of lightness (grey levels) that may be provided by the LCD 202. One of the features in the present invention is to have the LCD 202 to reproduce colors. The colors are in fact provided by the backlighting that uses at least three colored light sources.

Behind the LCD 202 is an LED based backlight section that includes a group of diffuser(s) and reflector(s) 204 and an array or matrix of light-emitting diodes 206. The diffuser(s) and reflector(s) 204, together with other optical parts (not shown, e.g., reflectors), provide optical means to distribute lighting from the light-emitting diodes 206 evenly to LCD 202. In the embodiment shown in FIG. 2A, the light-emitting diodes 206 comprise at least three types of colored light-emitting diodes. In one embodiment, three colored light-emitting diodes, such as Red, Green and Blue, are used.

To ensure that a white color is balanced or at a desired color temperature, a controller 208 is provided to control the power supply 210 that drives the light-emitting diodes 206. The controller 208 receives at least three types control signals, sensor feedback signals 212, video control signals 214 and lighting control signals 216.

In one embodiment, the sensor feedback signals 212 are from sensors positioned to sense the resultant backlighting. For three types of colored light-emitting diodes in red, green and blue, three sensors 209 are provided to sense respectively the red, green and blue lighting and provide respective feedback signals to the controller 208. For example, it is desired to have a relative power ratio of three colored light-emitting diodes as R:G:B=0.9:1:08. For some reasons, the ratio is no longer holding, the three sensors 209 can immediately detect the difference and send the feedback signals to the controller 208 that determines what necessary adjustments need to be provided to the power supply 210 that in return causes the colored light-emitting diodes to keep the ratio. In another embodiment, there are more than three sensors for more types of light-emitting diodes. Optionally, one of the sensors is provided to sense brightness of the combined lighting provided by the light-emitting diodes. In case, the overall brightness exceeds a certain threshold, the brightness sensor can detect and reduce the power proportionally to drive the light-emitting diodes. Further, other sensors may be used to sense individual color brightness and/or wavelength of each of the types of light emitting diodes or control the duty cycles of the light-emitting diodes to achieve desired backlighting for certain applications.

The video control signals 214 are a type of signals derived from a video processor configured to process display (video or image) signals for display on the LCD device. In the traditional display approach, the display signals are provided directly to the LCD 202 to control "on" or "off" of the subpixels, or precisely, control respective liquid crystals to allow a certain amount of white light to pass through corresponding color filters, resulting in color reproductions. In the present invention, the video control signals 214 are derived from the video signals to control respective liquid crystals to allow a certain amount of colored light to pass through for a controlled period, relying on the inherent color combining capability in human visual system to perceive a resultant combined color.

Figure 2C:
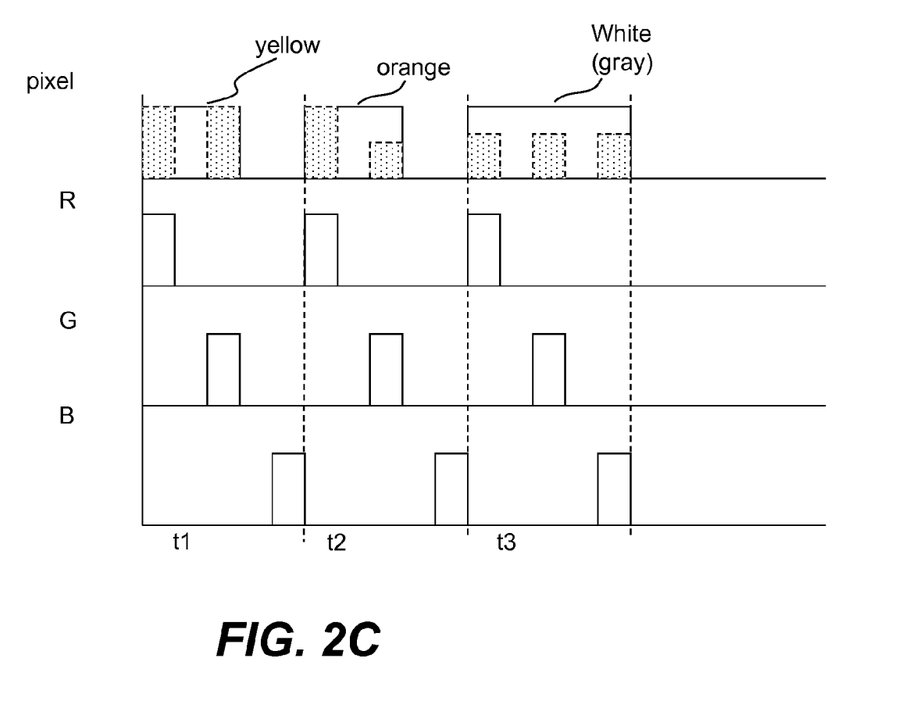
FIG. 2C shows operations of controlling pixels in the LCD of FIG. 2B with colored backlighting to reproduce colors.

FIG. 2C shows operations of controlling pixels in the LCD 202 with colored backlighting to reproduce colors. It is assumed that row r3 and column c5, c6 and c7 are selected via one or more LCD drivers 217. As a result, there are three pixels that are activated for display. In one embodiment, the colored backlighting employs red, green and blue LEDs that are turned successively in time. In accordance with a display signal 214 from the video processor 218, it is assumed that these pixels need to display "yellow", "orange" and "grey" sequentially at t1, t2 and t3. One of the important features in the present invention is to control the respective liquid crystals in these pixels to let proper colored lights to pass through so that the desired colors "yellow", "orange" and "white" are displayed or perceived at the right times.

During t1, the crystals of these pixels are fully turned to allow full passage of two colored lights for a predefined period and completely block the third one, in which both red and green lighting are successively passed through and blue lighting is blocked. When a viewer sees a red and a green light coming out successively in time and fast enough, the perceived color is "yellow" in human vision, wherein a "yellow" color is a combination of these two primary colors.

During t2, the crystals of these pixels are fully turned to allow full passage of a first colored light, half turned to allow half passage of a second colored light and block a third colored light. In the first predefined period with the full passage, only red light is fully passed through. In the second predefined period with the half passage, only 50% of the green light is passed through, resulting in a perceived "orange" in human vision.

During t3, the crystals of these pixels are half turned to allow half passage of all three colored lights to pass through, namely red, green, and blue colored lights, resulting in a perceived "gray" color in human vision. It can be understood that when the crystals of these pixels are fully turned to allow full passage of all three colored lights to pass through, the perceived color in human vision will be white.

In one embodiment, the passage of light by the crystals can be controlled to 256 different levels (shades). With the three colored lights, there can be 16.8 million different colors that can be perceived. Accordingly, as shown in FIG. 2C, the corresponding output for the color is (R, G, B)=(255, 255, 0) during t1, the corresponding output for the color is (R, G, B)=(255, 128, 0) during t2, and the corresponding output for the color is (R, G, B)=(255, 255, 255) during t3.

Referring back to FIG. 2A, the lighting control signals 216 are generated in accordance with a desired setting. For example, a certain TV manufacturer prefers to make some of its LCD TV sets to be a little reddish and others to be a little bluish. Accordingly, a 6500 K white color temperature (slightly reddish) or a 9000K white color temperature (slightly bluish) can be produced with proper weights on the respective light-emitting diodes. In one embodiment, three types of colored light emitting diodes are used, the relative power ratio of three colored light emitting diodes as R:G:B=1:1:0.9 is used. The corresponding lighting control signals 216 are thus generated to be sent to the controller 208 that ensures the power supply 210 to control the three colored light-emitting diodes in accordance with the ratio. Depending on implementation, other control signals, such as a brightness control signal, may be included in the lighting control signals 216.

With the sensor feedback signals 212, the video control signal 214 and the lighting control signals 216, the backlighting in a LCD device can be provided in any desirable way and readily controlled. In one embodiment, the light emitting diodes are in three colored groups, each colored group produces a desired color corresponding to a color temperature in the CIE colorimetry system. The optical sensors 209 are provided to ensure that such color temperature is maintained by providing the sensor feedback signals 212 to controller 208.

Figure 3A:
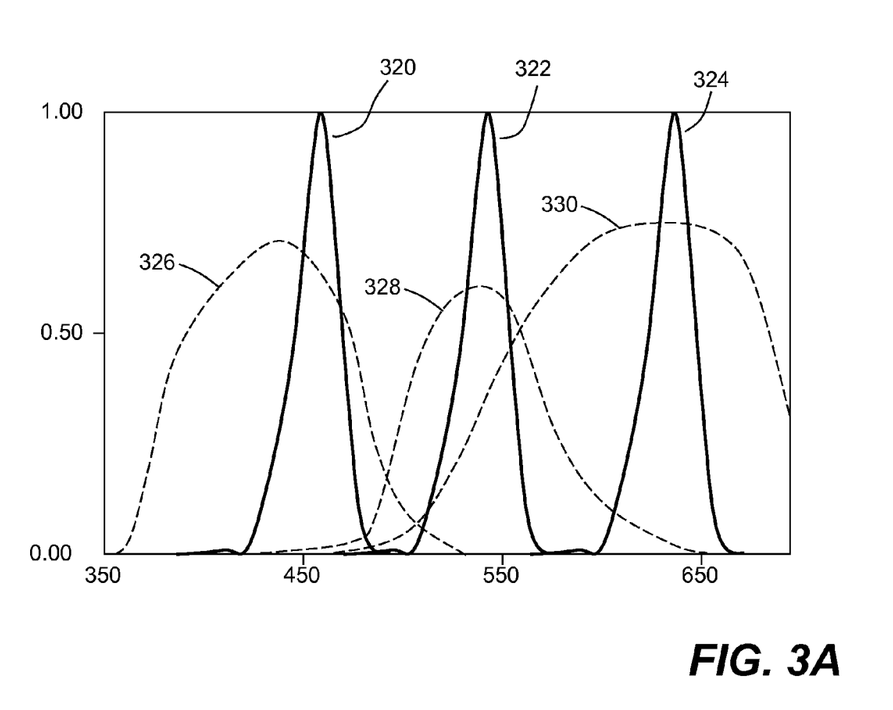
FIG. 3A shows three respective spectrums of three color (e.g., red, green and blue) groups of light emitting diodes superimposed by three approximated spectrums of red, green and blue that can be primarily perceived by a human vision system.

In LCD applications, colors are reproduced by combining three primary colors (e.g., red, green and blue). FIG. 3A illustrates three respective spectrums 320, 322, and 324 of three color (red, green and blue) groups of light emitting diodes. Superimposed are three approximated spectrums 326, 328, and 330 of red, green and blue that can be primarily perceived by a human vision system. Any colors mixed by red, green and blue can be perceived. However, the spectrums 320, 322, and 324 are much narrower than the spectrums 326, 328, and 330, there are certain colors that would not be reproduced because certain wavelengths are not there or not strong enough to reproduce the colors (e.g., colors around 500 nm or 600 nm).

Figure 3B:
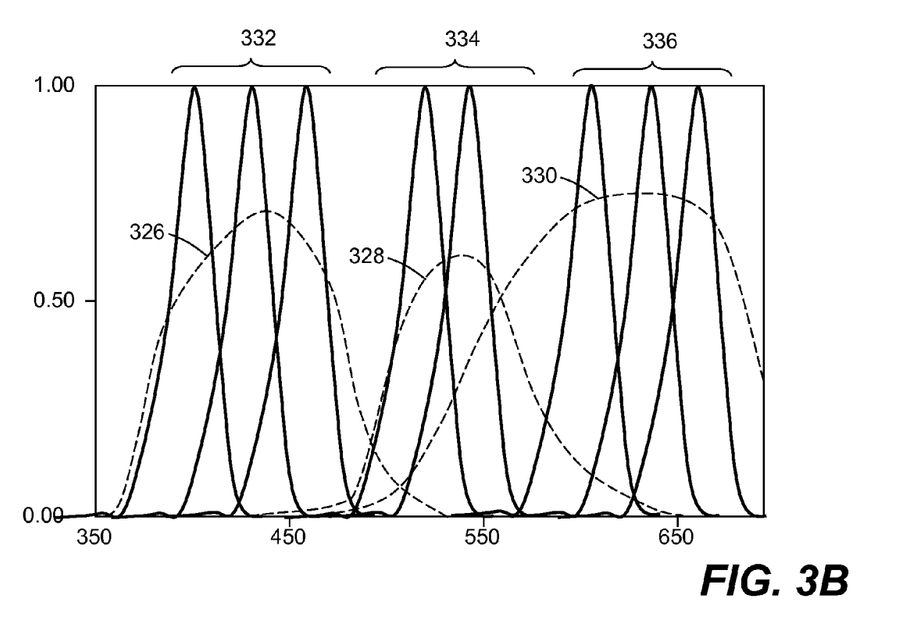
FIG. 3B shows that three types of light emitting diodes with similar color bins are used as a first color group, two types of light emitting diodes with similar color bins are used as a second color group, and another three types of light emitting diodes with similar color bins are used as a third color group.

An advantage of light-emitting diodes is that they are available in almost any wavelength in the visible region. For categorization, the light emitting diodes come in color bins or groups, each bin or group concentrating on a color. As used herein, a color of a light emitting diode means one of the color bins or groups. With the flexibilities of the colors of the light emitting diodes, the spectrum design of a primary color (e.g., red, green or blue) or even a white color (white balance) by the light-emitting diodes may be more flexible than for traditional discharge lamps. In one embodiment, more than three types of light-emitting diodes are used. FIG. 3B shows that three types of light emitting diodes with similar color bins 332 are used as a first color group, two types of light emitting diodes with similar color bins 334 are used as a second color group, and three types of light emitting diodes with similar color bins 336 are used as a third color group. As a result, nearly all colors can be reproduced by various mixtures of the three color groups.

Without loss of generality, the above embodiment may be described in the following. It is assumed a backlighting group C to reproduce all colors defined by a desired triangle, a spectrum or the entire CIE chromaticity diagram includes a set or group of R(i), G(i), and B(i), each representing one color group of light emitting diode, where i=1, 2, . . . , N, thus:

$$C = \left\{ \sum_{i=1}^{N} R(\lambda i), \sum_{i=1}^{M} G(\lambda i), \sum_{i=1}^{K} B(\lambda i) \right\}$$

where N, M and K are integers and may or may not be identical, λ indicates a wavelength or a color. When a backlighting section employs a plurality of sets of the backlighting groups, an even and full color spectrum of backlighting can be achieved, resulting in vivid displays of all desired colors. In addition, the full color spectrum can be broader than the color spectrum defined by a TV standard such as NTSC or PAL.

The invention may be implemented as a method, an apparatus or a port of a system, each yielding one or more of the following advantages and/or benefits. First, each pixel in an LCD does not have any subpixels, as if each of the subpixels in the traditional LCD is an independent pixel, hence the display resolution is greatly enhanced without actually increasing additional pixels. Secondly, unlike the subpixels in the traditional LCD in that each of the subpixels is predetermined to pass a specified colored light, such as three subpixels in a pixel are configured to transmit respectively red, green and blue lights, each of the pixels in the LCD contemplated in the present invention is not configured to pass a predefined colored light, the cost and complexity of the LCD are greatly reduced. Third, unlike the traditional LCD that uses subpixels in parallel, each for a color, the monochromic LCD as used herein has all colored lights come from a same pixel, thus colors are substantially registered, thus minimizing the possibility of color mosaic. Fourth, the light emitting diodes are in more than three predetermined colors but still grouped as three color lights. One of the purposes of having more than one colored lights in a color group is to ensure that the visible spectrum is as much covered as possible. Other advantages or benefits are apparent to those skilled in the art from the description herein.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the foregoing description of embodiments.

We claim:

1. A liquid crystal display (LCD) device comprising:
a backlighting unit including at least three groups of light emitting diodes (LEDs), the LEDs in each of the groups being in one type of color, the groups of the LEDs tuned on successively in a cycle and synchronized with at least a video signal coupled from a video processor receiving a display signal to be displayed on the liquid crystal display panel; and
a liquid crystal display panel including a plurality of pixels controlled by liquid crystals, each of the pixels including no further subpixels and reproducing a perceived color from a combined illumination from the at least three groups of LEDs, wherein at least three colored lights from the at least three groups of LEDs are transmitted successively through a corresponding liquid crystal, an amount of each of the at least three colored lights is controlled in accordance with the display signal.

2. The liquid crystal display device of claim 1, further comprising a controller provided to control the LEDs in each of the at least three groups in accordance with the display signal, where the controller is coupled to the video processor to receive synchronization signals in the display signal.

3. The liquid crystal display device of claim 1, further comprising one or more drivers to control the pixels in the liquid crystal display panel in accordance with the display signal.

4. The liquid crystal display device of claim 1, further comprising one or more drivers to control the liquid crystal of each of the pixels such that an amount of lighting passing through the liquid crystal is controlled in accordance with the display signal.

5. The liquid crystal display device of claim 1, further comprising one or more drivers to control the liquid crystal of each of the pixels such that a duration of the liquid crystal is turned on to allow a predefined amount of light passing through the liquid crystal is controlled to achieve a perceived color.

6. The liquid crystal display device of claim 1, further comprising one or more drivers to control the liquid crystal of each of the pixels such that an amount of lighting passing through the liquid crystal is determined in the cycle, wherein the one or more drivers also control the liquid crystal of each of the pixels such that respective durations of the liquid crystal sequentially turned on to allow a corresponding type of light passing through the liquid crystal are determined in the cycle.

7. The liquid crystal display device of claim 1, wherein the at least three groups of light emitting diodes (LEDs) include red (R), green (G) and blue (B) color groups.

8. The liquid crystal display device of claim 7, wherein the LEDs in each of the at least three groups have predefined offsets in wavelengths or colors.

9. The liquid crystal display device of claim 8, wherein the some offsets in wavelengths or colors are to ensure that colors in a predefined visible spectrum are substantially reproduced.

10. The liquid crystal display device of claim 9, wherein the predefined visible spectrum is a superset of colors defined in accordance with a TV standard.

11. The liquid crystal display device of claim 7, further comprising sensors to sense respective colors from the red (R), green (G) and blue (B) color groups, signals from the sensors is fed back to a controller to control the light emitting diodes in accordance with a predetermined power ratio for the light emitting diodes in the red (R), green (G) and blue (B) color groups.

12. A liquid crystal display (LCD) device comprising:
a backlighting unit including three colored groups of light emitting diodes (LEDs);
a controller controlling the three colored groups of LEDs in accordance with sensor signals from sensing respective lights from the three colored groups of LEDs; and
a liquid crystal display panel including a plurality of pixels, each of the pixels including no further subpixels and reproducing a perceived color from a combined illumination produced by the three colored groups of LEDs—through a corresponding liquid crystal in a specified amount, wherein the three colored groups of LEDs are turned on and off sequentially in a cycle synchronized with a display signal to be displayed on the liquid crystal display panel, an illumination from each of the three colored groups of LEDs is substantially evenly distributed to one side of the liquid crystal display panel by at least a light guide and a diffuser.

13. The liquid crystal display device of claim 12, further comprising a set of sensors configured to sense respective colored lights and provide one or more of the sensor signals.

14. The liquid crystal display device of claim 12, further comprising one or more drivers to control the pixels in the liquid crystal display panel in accordance with the display signal.

15. The liquid crystal display device of claim 14, further comprising one or more drivers to control the liquid crystal of each of the pixels such that an amount of light passing through the liquid crystal is controlled in accordance with the display signal.

16. The liquid crystal display device of claim 14, further comprising one or more drivers to control the liquid crystal of each of the pixels such that a duration of the liquid crystal is turned on to allow a predefined amount of light passing through the liquid crystal is controlled in accordance with the display signal.

17. The liquid crystal display device of claim 14, further comprising one or more drivers to control the liquid crystal of each of the pixels such that an amount of light passing through the liquid crystal is determined in the cycle.

18. The liquid crystal display device of claim 17, wherein the amount of light passing through the liquid crystal in a controlled way together with durations controlled for respective types of lighting passing through the liquid crystal are capable to reproduce millions of perceived colors.

* * * * *

UNITED STATES PATENT AND TRADEMARK OFFICE
CERTIFICATE OF CORRECTION

| | |
|---|---|
| PATENT NO. | : 8,188,957 B2 |
| APPLICATION NO. | : 13/183429 |
| DATED | : May 29, 2012 |
| INVENTOR(S) | : Hu et al. |

It is certified that error appears in the above-identified patent and that said Letters Patent is hereby corrected as shown below:

In Column 2, Line 44, delete "invention" and insert -- invention. --, therefor.

In Column 2, Line 46, delete "suppixels" and insert -- subpixels --, therefor.

In Column 3, Line 56, delete "suppixels" and insert -- subpixels --, therefor.

Signed and Sealed this
Ninth Day of October, 2012

David J. Kappos
*Director of the United States Patent and Trademark Office*